(12) United States Patent
Hikosaka et al.

(10) Patent No.: US 11,352,470 B2
(45) Date of Patent: Jun. 7, 2022

(54) POLYAMIDE RESIN MEMBER AND PRODUCTION METHOD THEREFOR

(71) Applicant: BRIDGESTONE CORPORATION, Tokyo (JP)

(72) Inventors: Masamichi Hikosaka, Higashi-Hiroshima (JP); Kiyoka Okada, Higashi-Hiroshima (JP); Kenichiro Iwasaki, Tokyo (JP); Kei Yasui, Tokyo (JP); Katsuomi Tanahashi, Tokyo (JP); Katsumi Nabeshima, Tokyo (JP); Mai Ishikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 93 days.

(21) Appl. No.: 16/611,592

(22) PCT Filed: May 9, 2018

(86) PCT No.: PCT/JP2018/017960
§ 371 (c)(1),
(2) Date: Nov. 8, 2019

(87) PCT Pub. No.: WO2018/207830
PCT Pub. Date: Nov. 15, 2018

(65) Prior Publication Data
US 2020/0157295 A1 May 21, 2020

(30) Foreign Application Priority Data
May 12, 2017 (JP) .............................. JP2017-096048

(51) Int. Cl.
*C08J 5/18* (2006.01)
*B29C 55/00* (2006.01)
*B29K 77/00* (2006.01)

(52) U.S. Cl.
CPC .............. *C08J 5/18* (2013.01); *B29C 55/005* (2013.01); *B29K 2077/00* (2013.01); *C08J 2377/06* (2013.01)

(58) Field of Classification Search
CPC .................... C08J 5/00–18; C08J 2377/06; C08J 2377/10; B29C 55/005
See application file for complete search history.

(56) References Cited

U.S. PATENT DOCUMENTS

| 5,695,698 A | 12/1997 | Ajji et al. |
| 2010/0063235 A1 | 3/2010 | Hikosaka et al. |
| 2011/0300364 A1 | 12/2011 | Hikosaka et al. |
| 2017/0295645 A1 | 10/2017 | Hikosaka et al. |

FOREIGN PATENT DOCUMENTS

| JP | 02022032 A | * | 1/1990 |
| JP | 2001341198 A | * | 11/2001 |
| JP | 2012-93662 A | | 5/2012 |
| JP | 2012-93664 A | | 5/2012 |
| JP | 2012-111109 A | | 6/2012 |
| JP | 2013-240940 A | | 12/2013 |
| JP | 2016-117817 A | | 6/2016 |
| WO | 2008/108251 A1 | | 9/2008 |
| WO | 2010/084750 A1 | | 7/2010 |
| WO | 2016/035598 A1 | | 3/2016 |

OTHER PUBLICATIONS

JP 02022032 A machine translation (Jan. 1990).*
JP 2013240940 A machine translation (Dec. 2013).*
JP 2001341198 A machine translation (Nov. 2001).*
International Preliminary Report on Patentability with a Translation of Written Opinion in International Application No. PCT/JP2018/017960, dated Nov. 21, 2019.
International Search Report in International Application No. PCT/JP2018/017960, dated Aug. 7, 2018.
Communication dated Apr. 6, 2020 by the European Patent Office in application No. 18798813.4.

* cited by examiner

Primary Examiner — Ana L. Woodward
(74) Attorney, Agent, or Firm — Sughrue Mion, PLLC

(57) ABSTRACT

The present invention achieves higher performance (improvement in, for example, heat resistance, durability, and mechanical characteristics) of polyamide resin by a method which is not dependent on a combination with fibers. According to an embodiment of a polyamide resin member of the present invention, the polyamide resin member contains nano-oriented crystals of polyamide 66, and has a high heatproof temperature ($T_h \approx 278°$ C.) and a high melting point ($T_m \approx 282°$ C.).

5 Claims, 10 Drawing Sheets

| No. | $I_{Xraw}$ | $q$ / nm$^{-1}$ | spacing | | |
|---|---|---|---|---|---|
| | | | $d_{obs}$ / nm | $d_{cal}(\alpha)$ / nm [1] | hk0 [1] |
| (1) | VS | 14.32 | 0.439 | 0.440 | 100 |
| (2) | VS | 17.02 | 0.369 | 0.366 | 010/110 |

[1] C. W. Bunn and E. V. Garner, Proc. Roy. Soc., A189, 39 (1947).

POLYAMIDE RESIN MEMBER AND PRODUCTION METHOD THEREFOR

CROSS REFERENCE TO RELATED APPLICATIONS

This application is a National Stage of International Application No. PCT/JP2018/017960 filed May 9, 2018, claiming priority based on Japanese Patent Application No. 2017-096048 filed May 12, 2017.

TECHNICAL FIELD

The present invention relates to a polyamide resin member containing crystals of polyamide resin. The present invention also relates to a method of producing a polyamide resin member containing crystals of polyamide resin.

BACKGROUND ART

Polyamide resins such as polyamide 66 (polyamide6,6; hereinafter referred to as "PA66") are crystalline resins classified as thermoplastic engineering plastic. Polyamide resins are known to be excellent not only in mechanical characteristics, chemical resistance, and oil resistance, but also in workability and recyclability. In recent years, for the purpose of weight reduction, there has been an increasing movement toward replacing metal parts with resin parts in automobiles. There have already been cases where, for example, PA66 is applied to vibration absorbing rubber products such as engine mounts, torque rods, arm bushes, and steering couplings.

Meanwhile, conventional PA66 unfortunately cannot sufficiently exhibit actual high performance (mechanical characteristic and heat resistance) of crystals of PA66. This is supposedly because of the following reason: The conventional PA66 is constituted by (i) a lamellar structure in which folded chain crystals (hereinafter referred to as "FCC" as appropriate) and amorphous portions are alternately laminated and (ii) spherulite formed by branching of the lamellar structure. Therefore, the degree of crystallinity of the conventional PA66 is not very high, and the amorphous portions consequently decrease the performance of PA66. Furthermore, the amorphous portions of PA66 are water absorbent. Therefore, a decrease in performance of PA66 due to water absorption is an additional drawback.

In an attempt to overcome these drawbacks, conventionally, PA66 has been reinforced through use in combination with fibers such as glass (see, for example, Patent Literature 1).

Meanwhile, Hikosaka (the inventor of the present invention) and others have successfully achieved higher performance of polymeric materials such as polyolefin (e.g., polypropylene) and polyester (e.g., polyethylene terephthalate) by preparing polymeric materials which contain nano-oriented crystals (hereinafter referred to as "NOC" as appropriate) and have a sheet-like form or a film-like form (see, for example, Patent Literature 2 and Patent Literature 3).

CITATION LIST

Patent Literature

[Patent Literature 1]
Japanese Patent Application Publication, Tokukai, No. 2016-117817 (Publication Date: Jun. 30, 2016)

[Patent Literature 2]
Pamphlet of International Publication No. WO 2010/084750 (International Publication Date: Jul. 29, 2010)

[Patent Literature 3]
Pamphlet of International Publication No. WO 2016/035598 (International Publication Date: Mar. 10, 2016)

SUMMARY OF INVENTION

Technical Problem

However, the complex of PA66 disclosed in Patent Literature 1 unfortunately causes an increase in specific gravity of the complex, due to the fibers such as glass. Furthermore, in order to recycle the complex of PA66 disclosed in Patent Literature 1, it is necessary to separate the fibers such as glass from polyamide resin. This unfortunately impairs recyclability. Use of polyamide resins such as PA66 is expected to expand also in the technical fields such as those of vibration absorbing rubber product, tire, hose, pipe, and joint. However, due to the problems described above, such use is not expanding.

Under the circumstances, it is an object of the present invention to achieve higher performance (improvement in, for example, heat resistance, durability, and mechanical characteristics) of polyamide resin such as PA66 by a method which is not dependent on the combination with fibers.

Solution to Problem

In order to attain the object, the inventors of the present invention have conduct diligent study and, as a result, succeeded for the first time in obtaining a polyamide resin member which contains NOCs of PA66 by crystallizing a melt of PA66 as an example of polyamide resin while elongating the melt at a rate not lower than a critical elongation strain rate. Then, the inventors of the present invention found that in comparison with the conventional PA66 products, the polyamide resin member has (i) a higher heatproof temperature ($T_h \approx 278°$ C.), (ii) a higher melting point ($T_m \approx 282°$ C.), and (iii) a lower water absorbent property. In addition, the inventors of the present invention also found that the polyamide resin member has high tensile stress. Based on these pieces of knowledge, the present invention was completed. Specifically, an aspect of the present invention encompasses the following:

<1> A polyamide resin member containing: crystals of a polyamide resin,
the crystals being nano-oriented crystals containing crystals of the polyamide resin in each of which a polymer molecular chain is oriented and each of which has a crystal size of 50 nm or less,
the polyamide resin member having a melting point higher than a temperature which is 38° C. lower than an equilibrium melting point of the polyamide resin, and
the polyamide resin member having a heatproof temperature higher than a temperature which is 143° C. lower than the equilibrium melting point of the polyamide resin.

<2> A polyamide resin member containing: crystals of a polyamide resin,
the crystals being nano-oriented crystals containing crystals of the polyamide resin in each of which a polymer molecular chain is oriented and each of which has a crystal size of 50 nm or less, and
the polyamide resin member having a tensile stress of 105 MPa or more in an elongation direction in an absolutely dry condition and having a tensile stress of 90 MPa or more in a width direction in the absolutely dry condition.

<3> The polyamide resin member described in <1> or <2>, in which the polyamide resin member has a sheet-like form.

<4> The polyamide resin member described in any one of <1> through <3>, in which the crystals of the polyamide resin, which are contained in the polyamide resin member, are such that the polymer molecular chain is oriented in an elongation direction and in a direction perpendicular to the elongation direction.

<5> The polyamide resin member described in any one of <1> through <4>, in which the polyamide resin is at least one polyamide resin selected from the group consisting of polyamide 4, polyamide 6, polyamide 46, polyamide 66, polyamide 610, polyamide 612, polyamide 6T, polyamide 9T, polyamide 6I, polyamide 2Me5T (where Me is a methyl group), polyamide MXD6, polyamide PXD12, and a copolymer and/or a blend containing at least one of these polyamides as a constituent.

<6> The polyamide resin member described in any one of <1> through <5>, in which the polyamide resin is polyamide 66.

<7> The polyamide resin member described in <6>, in which the polyamide resin member has a melting point of 280° C. or higher and a heatproof temperature of 270° C. or higher.

<8> A method of producing a polyamide resin member, the polyamide resin member containing: crystals of a polyamide resin, the method including the steps of:

feeding a supercooled melt of the polyamide resin from a supercooled melt feeder; and crystallizing the supercooled melt of the polyamide resin by (i) sandwiching the supercooled melt between sandwiching rollers and (ii) elongating the supercooled melt by rolling at an elongation strain rate not lower than a critical elongation strain rate.

Advantageous Effects of Invention

A polyamide resin member in accordance with an embodiment of the present invention has higher heat resistance, higher melting point, higher tensile stress, and lower water absorbent property in comparison with conventional polyamide resin products. With an aspect of the present invention, therefore, it is possible to achieve higher performance (improvement in, for example, heat resistance, durability, and mechanical characteristics) of polyamide resin by a method which is not dependent on the combination with fibers. It is therefore possible to utilize polyamide resin such as PA66 in the technical fields such as those of vibration absorbing rubber product, tire, hose, pipe, and joint.

DESCRIPTION OF EMBODIMENTS

Figure 1:
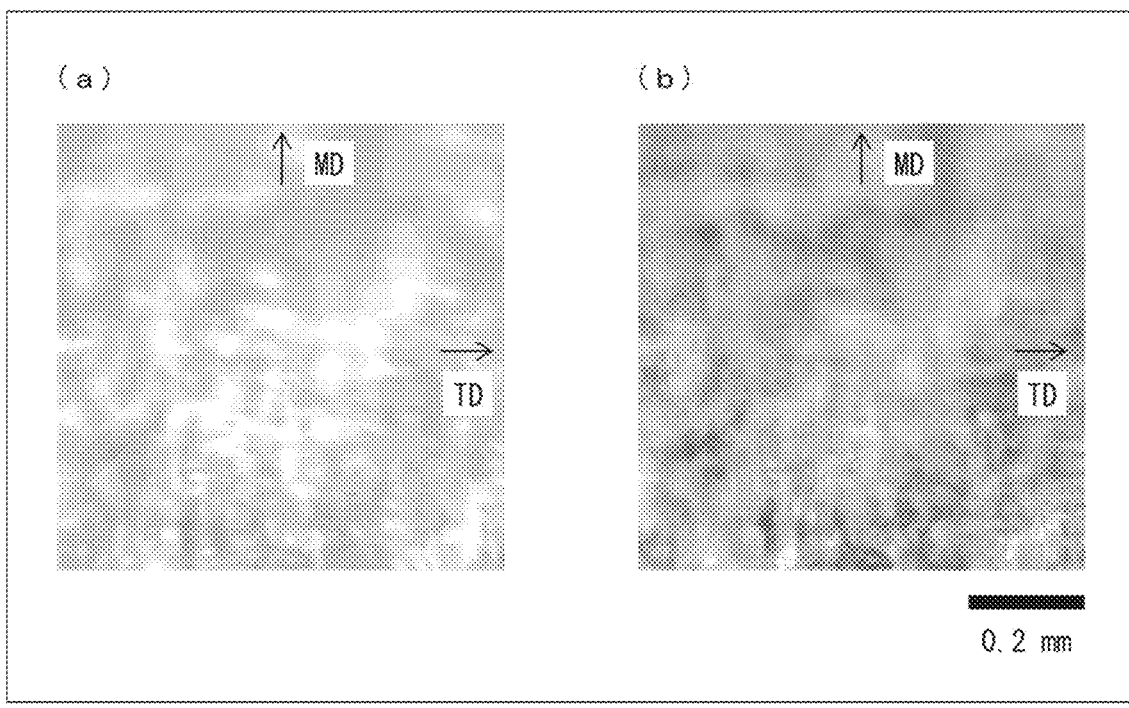
FIG. 1 is a set of views illustrating polarizing microscope images (results of observation in a through direction) of a sample in Example (sample 1 in Table 2).

The following description will discuss the present invention in detail. The scope of the present invention is, however, not limited to this description. Besides the examples below, the present invention can also be modified as appropriate and put into practice so that the object of the present invention can still be achieved. All the publicly known literatures mentioned herein are incorporated herein by reference.

Any range expressed herein with the term "to" means "not less (lower) than . . . and not more (higher) than . . . " unless otherwise specified. For example, the expression "A to B" means "not less (lower) than A and not more (higher) than B".

An embodiment of the present invention provides a polyamide resin member containing crystals of polyamide having a high heatproof temperature, a high melting point, and a low water absorbent property. The form of the polyamide resin member is not limited to any particular one. Examples of the form encompass a sheet-like form, a string-like form (rope-like form), a cylindrical form, a plate-like form, a bulk form (aggregate form), and any forms obtained by a variety of molding.

As a representative example of the polyamide resin member, a sheet-like polyamide resin member (hereinafter referred to as "polyamide resin sheet") will be described below. However, the present invention is not limited to such a polyamide resin, but polyamide resin members having other forms are also encompassed in the scope of the present invention.

(1) Polyamide Resin Sheet of Present Invention

A polyamide resin sheet in accordance with an embodiment of the present invention (hereinafter referred to as "polyamide resin sheet of the present invention") is of a polyamide resin sheet containing crystals of polyamide having a high heatproof temperature, a high melting point, and a low water absorbent property. The term "polyamide resin sheet" refers to not only a sheet-like polyamide resin having an average thickness of not less than 0.15 mm, but also a film-like polyamide resin sheet having an average thickness of less than 0.15 mm. Note that the average thickness is not particularly limited, and can be adjusted as appropriate by adjusting an extrusion rate or the like in accordance with a purpose of use. A specific thickness can be preferably 1 μm to 10 mm, 2 μm to 5 mm, and particularly 3 μm to 1 mm. Here, the "thickness" means a distance from one surface to the other surface of a polymer sheet measured under a constant static load. The "average thickness" means an average value of a largest thickness and a smallest thickness of the polymer sheet. Note that the thickness of the polymer sheet can be measured by using a micrometer or using a scale calibrated with an optical stereoscopic microscope (SZX10-3141 manufactured by Olympus Corporation) and an objective micrometer.

The "polyamide" means a polymer formed by a large number of monomers bound together via amide bonds. The polyamide in accordance with an embodiment of the present invention (hereinafter referred to as "polyamide of the present invention") can be prepared by, for example, (i) polycondensation reactions of ω-amino acids or (ii) a co-condensation reaction of diamines and dicarboxylic acids. Note that the polyamide of the present invention can be a homopolymer or can be a copolymer.

Examples of the polyamide of the present invention encompass, but are not particularly limited to, at least one polyamide resin selected from the group consisting of PA4, PA6, PA46, PA66, PA610, PA612, PA6T, PA9T, PA6I, PA2Me5T (where Me is a methyl group), PAMXD6, PAPXD12, and a copolymer and/or a blend containing at least one of these polyamides as a constituent. Among these, PA66 and PA6 are preferable, and polyamide 66 is particularly preferable. Note that "PA" refers to polyamide.

The polyamide resin sheet of the present invention has a high heatproof temperature. Here, the "heatproof temperature" means a heatproof temperature measured by a test-piece size direct-reading method with use of an optical microscope. The "test-piece size direct-reading method" is carried out with use of an optical microscope with a CCD camera (BX51N-33P-OC manufactured by Olympus Corporation), a hot stage (L-600A manufactured by Linkam Scientific Instruments Ltd.), and image-analysis software (Image-Pro PLUS manufactured by Media Cybernetics, Ltd.) that can quantitatively determine a size displayed on a screen. The test piece has a length of 0.7 mm and a width of 0.5 mm. The test piece is heated at a temperature increase rate of 1 K per minute, and a temperature at which the test piece starts to be strained (shrunk or expanded) by 3% or more in a length direction (MD) or a width direction (TD) is used as the heatproof temperature. In a case where no strain (shrinkage or expansion) by 3% or more in the length direction (MD) or the width direction (TD) is observed until the melting point is reached, the melting point is used as the heatproof temperature.

The heatproof temperature of the polyamide resin sheet of the present invention is higher than a temperature that is lower than an equilibrium melting point of the polyamide by 143° C. (more preferably lower than the equilibrium melting point by 100° C., even more preferably lower than the equilibrium melting point by 50° C.). For example, it is known that the equilibrium melting point of PA66 is approximately 303° C. (Reference Literature: S. S. Lee & P. J. Phillips, Euro. Polymer J., 43, 1933 (2007)). It can therefore be said that in a case where the polyamide resin sheet of the present invention is PA66, the heatproof temperature is higher than 160° C. (=303° C.−143° C.). The heatproof temperature of the polyamide resin sheet of the present invention is, although depending on a resin by which the polyamide is constituted, preferably 170° C. or higher (more preferably 200° C. or higher, even more preferably 220° C. or higher, and most preferably 270° C. or higher). A comparison with PA66 shows that a heatproof temperature of a conventionally known sheet of PA66 is approximately 160° C., and it is thus evident that the heat resistance (278° C. in Example) of the polyamide resin sheet of the present invention is remarkably high.

Moreover, the polyamide resin sheet of the present invention is high in melting point, as well as the high heat resistance. That is, the melting point of the polyamide resin sheet of the present invention is preferably higher than a temperature which is lower than the equilibrium melting point of the polyamide by 38° C. (more preferably lower than the equilibrium melting point by 35° C., and even more preferably lower than the equilibrium melting point by 30° C.). For example, it is known that the equilibrium melting point of PA66 is approximately 303° C. (Reference Literature: S. S. Lee & P. J. Phillips, Euro. Polymer J., 43, 1933 (2007)). It can therefore be said that in a case where the polyamide resin sheet of the present invention is PA66, the melting point is higher than 265° C. (=303° C.−38° C.). In a case where the polyamide resin sheet of the present invention is PA66, for example, the melting point of the polyamide resin sheet is preferably 270° C. or higher (more preferably 275° C. or higher, further preferably 280° C. or higher). In view of the fact that the melting point of PA66 itself is 265° C., it can be understood that the melting point of the polyamide resin sheet of the present invention is remarkably high. A melting point of a sample (PA66 resin sheet) in Example discussed later is 282° C., which is a remarkably increased temperature in comparison with the melting point of PA66. This can be understood as an advantageous effect over the conventional techniques.

Here, the equilibrium melting point ($T_m^0$) is a melting point of a macroscopic-sized perfect crystal crystallized in a state in which a molecular chain of a polymer (hereinafter, also referred to as "polymer chain" as appropriate) is fully stretched, and is calculated by the following formula: $T_m^0 = \Delta H_u / \Delta S_u$, (where $\Delta H_u$ indicates the enthalpy of fusion, and $\Delta S_u$: indicates the entropy of fusion).

The melting point is a temperature $T_m$ at which a crystal changes into a melt.

The equilibrium melting point of polyamide is publicly known through literature. For example, the equilibrium melting point of PA66 is approximately 303° C. (Reference Literature: S. S. Lee & P. J. Phillips, Euro. Polymer J., 43, 1933 (2007)), the equilibrium melting point of PA6 is approximately 278° C. (Reference Literature: S. Fakirov, N. Avramova, J. Polym. Sci. C, 20, 635 (1982)), and the equilibrium melting point of PA46 is 307° C. (Reference Literature: Q. Zhang, Z. Zhang, H. Zhang, Z. Mo, J Polym Sci Polym Phys, 40, 1784 (2002)).

Furthermore, the polyamide resin sheet of the present invention not only has high heat resistance and a high melting point, but also has a low water absorbent property. The water absorbent property (water absorption rate) of the polyamide resin sheet can be measured by, for example, by the Karl Fischer method described in Example discussed later.

The polyamide resin sheet of the present invention contains nano-oriented crystals (NOC) of polyamide resin. Here, NOCs contain crystals (also referred to nano crystals (NC)) of the polyamide, each of which has a crystal size of 50 nm or less and in each of which a polymer chain is oriented in an elongation direction (machine direction, MD).

The polyamide resin sheet of the present invention is demanded to have high heat resistance, and therefore preferably contains NOCs as a main component. For example, the polyamide resin sheet of the present invention preferably contains NOCs of the polyamide by 60% or higher (preferably 70% or higher, more preferably 80% or higher, even more preferably 90% or higher, still more preferably 95% or higher). A ratio of NOCs (NOC fraction) contained in the polyamide resin sheet can be calculated by an X-ray diffractometry method. NOCs are highly oriented, and non-NOCs are isotropic. Therefore, the NOC fraction can be calculated based on an X-ray scattering intensity ratio.

As described above, the polyamide resin sheet of the present invention has a lower water absorbent property in comparison with the conventional polyamide resin sheets because the polyamide resin sheet of the present invention contains NOCs (see Example discussed later). The fact that the polyamide resin sheet has a low water absorbent property because of the NOCs therein is a remarkable effect of the present invention which in no way could be expected from the conventional techniques. It is such a remarkable effect which prevents the performance of the polyamide resin sheet of the present invention from deteriorating when the polyamide resin sheet absorbs water.

Whether or not the polymer chain of NCs contained in the NOCs constituting the polyamide resin sheet is oriented and whether or not NCs themselves constituting the NOCs are oriented can be confirmed by observation with use of a polarization microscope or by publicly known X-ray diffractometry (small-angle X-ray scattering method, wide-angle X-ray scattering method). For details of the observation with use of a polarizing microscope and the X-ray diffractometry method (small-angle X-ray scattering method, wide-angle X-ray scattering method), reference may be made as appropriate to Example discussed later.

The crystal size of NOCs contained in the polyamide resin sheet of the present invention is 50 nm or less (preferably 40 nm or less, more preferably 30 nm or less, even more preferably 20 nm or less). Note that the crystal size of the NOCs can be obtained by a publicly known small-angle X-ray scattering method (hereinafter referred to as "SAXS method"). Note that a lower limit of the crystal size of the NOCs is not particularly limited, and is preferably 3 nm or more (preferably 5 nm or more, more preferably 8 nm or more, even more preferably 10 nm or more), from the viewpoint of the melting point. In the SAXS method, in a case where the NOC fraction is large, a primary peak of a curve of the small-axis X-ray scattering intensity ($I_x$) against the scattering vector (q) corresponds to the shortest distance between microcrystals (=crystal size d) in cases where microcrystals of an average size d are randomly packed (Reference Literature: A. Guinier, "Ekkusu-sen Kessyogaku no Riron to Jissai" (Theory and Practice of X-ray Crystallography), Rigaku Corporation, p. 513, 1967), and therefore the crystal size d is calculated by the following Bragg equation:

$$d=2\pi/q \qquad \text{Bragg equation}$$

Figure 9:
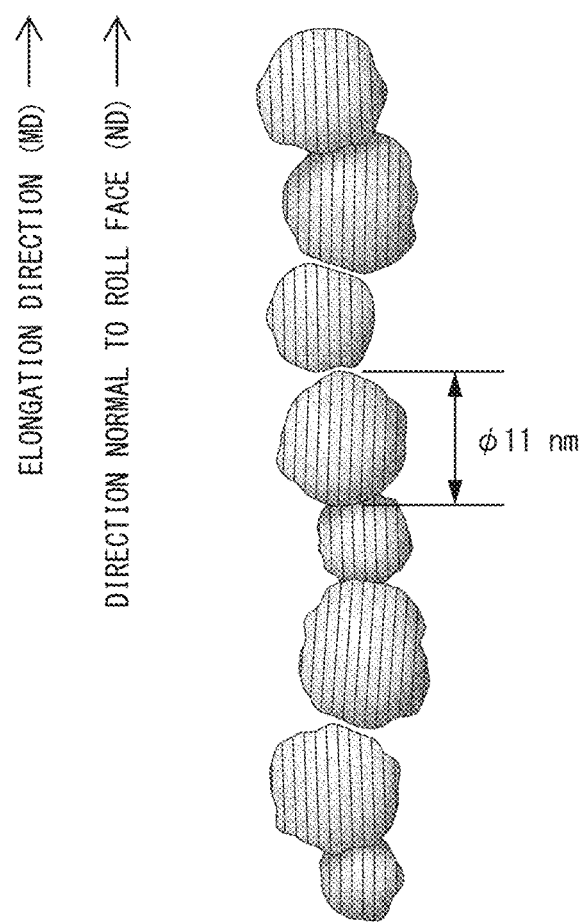
FIG. 9 is view schematically illustrating a structure of NOCs constituting the sample in Example (sample 2 in Table 2).

Note that the crystal size of the NC constituting the NOCs contained in the polyamide resin sheet in Example discussed later is found to be approximately 11 nm in the elongation direction (MD), approximately 18 nm in the width direction (TD) of the sheet, and approximately 11 nm in the thickness direction (Normal direction: ND) of the sheet, as illustrated in FIG. 9 (FIG. 9 shows only MD and ND). The size in TD was obtained by analysis of the expansion of a two-point image. The crystal size of a spindle-shaped crystal such as those of the NCs constituting the NOCs can be the largest one of sizes measured in the MD, the TD, and the ND. That is, the crystal size of the NOCs illustrated in FIG. 9 is approximately 18 nm.

A structure of the NOCs constituting the polyamide resin sheet of the present invention is inferred with use of a polarization microscope and based on a result of X-ray diffractometry. FIG. 9 illustrates a structure model of NOCs of PA66 obtained in Example. The NOCs constituting the polyamide resin sheet obtained in Example are found to have a structure in which spindle-shaped crystals (NCs) are arranged in such a manner as to be tied in a row in the elongation direction (MD). The spindle shape means a shape like a spindle, i.e., a columnar shape whose middle part is the thick and which is gradually thinner toward both ends. The spindle shape is also similar to that of a rugby ball. Therefore, the term "spindle-shaped" can also be expressed as "rugby-ball-shaped".

Furthermore, the polymer molecular chains of NOCs contained in the polyamide resin sheet of the present invention are oriented in (i) the elongation direction (i.e., MD) and (ii) a direction (i.e., ND) perpendicular to the elongation direction. That is, the polyamide resin sheet of the present invention was found to be configured so that NCs contained in the NOCs and the polymer chain contained in the NCs were highly oriented substantially in the MD and in the ND simultaneously. It is a characteristic structure of the polyamide resin sheet of the present invention that the NCs and the polymer chain are thus oriented in the two directions of the MD and the ND. Because the NCs and the polymer chain are thus oriented in the two directions, the polyamide resin sheet of the present invention brings about an effect of exhibiting high mechanical strength not only in the MD but also in the ND.

It was surprising that the polyamide resin sheet of the present invention was configured so that the NCs contained in the NOCs and the polymer chain contained in the NCs were oriented in the two directions of the MD and the ND. This is because although the orientation in the MD can be explained by the conventional NOC generation mechanism (Okada, K. et al. Polymer J., 45, 70 (2013)), there has not existed any theories that explain the orientation in the ND.

The inventors of the present invention therefore infer the reason for the orientation in the ND as follows (this inference will be referred to as "H-bond cluster model").

That is, H-bond cluster is generated and disappears also in a melt of PA66 (K. Tashiro, Private communication). In α-crystals of PA, there exist H-bond surfaces in a flat-plate state (hereinafter referred to as "H-bond surface") in which the in-surface density of H-bonds is at maximum and which extend parallel to (001) (Reference Literature: Bunn, C. W. & Garner, E. V. Proc. Royal Soc. London, A (189), 39 (1947)). The polymer chain passes through the H-bond surfaces (Reference Literature: Bunn, C. W. & Garner, E. V. Proc. Royal Soc. London, A (189), 39 (1947)). While an angle at which the polymer chain passes through the H-bond surfaces is determined by α and β, the angle can be regarded as perpendicular in 0th order approximation (Reference Literature: Bunn, C. W. & Garner, E. V. Proc. Royal Soc. London, A (189), 39 (1947)). If H-bond cluster which is superior in the melt of PA66 is assumed to be in the flat form in which the fine H-bond surfaces are arranged, then, in a case where the melt of PA66 is subjected to rolling elongation with use of a roller, the H-bond cluster is arranged parallel to the roll face because the H-bond cluster surface is in a flat-plate state (Reference Literature: Tomomasa TATSUMI, Fluid Dynamics, P. 171 (Tokyo, BAIFUKAN CO., LTD, 1982)). Note, however, that in the melt, the H-bond cluster surface and the angle at which the polymer chain passes through H-bond surfaces greatly fluctuate due to thermal fluctuation. Hence, the normal vector of the H-bond cluster surface and the passing polymer chain are oriented in the ND (in 0th order approximation). The H-bond cluster and the passing polymer chain thus oriented can be regarded as embryos (precursors of nucleus). This supposedly accelerates the nucleation, so that the NOCs oriented in the ND are generated.

A tensile stress of the polyamide resin sheet of the present invention in an absolutely dry condition is preferably 105 MPa or more in the elongation direction and 90 MPa or more in the width direction, more preferably 110 MPa or more in the elongation direction and 95 MPa or more in the width direction, and even more preferably 115 MPa or more in the elongation direction and 100 MPa or more in the width direction. In a case where the tensile stress in the absolutely dry condition falls within the above ranges, it is possible to apply non-reinforced polyamide to a purpose for which polyamide reinforced by an inorganic filler such as glass is conventionally used. It is therefore possible to improve low specific gravity, abrasion resistance, flexibility, recyclability, and the like. This advantageously makes it possible to expect that the polyamide resin sheet of the present invention can be applied to purposes such as vibration absorbing rubber products, tires, hoses, pipes, and joints.

The tensile stress in the absolutely dry condition is a parameter in the criteria for determining whether or not a product may encounter trouble such as deformation and destruction in a case where the product is used for the intended purpose. Note that the tensile stress in the absolutely dry condition is measured by a method in conformity to JIS7127 (ISO527-3).

The NOCs contained in the polyamide resin sheet of the present invention preferably has an α-crystal structure (unit cell structure). The fact that the NOCs contained in the polyamide resin sheet of the present invention have such a crystal structure seems to lead to the most stable state of the polyamide resin sheet of the present invention, and consequently achieves high heat resistance and high melting point of the polyamide resin sheet of the present invention. In addition, because of the above crystal structure and high crystallinity of the NOCs contained in the polyamide resin sheet of the present invention, it is expected that a decrease in performance of the polyamide resin sheet due to water absorption is prevented.

The polyamide resin sheet of the present invention has excellent heat resistance, and therefore can be suitably used as, for example, a polyamide resin sheet for high-temperature processing at a temperature higher than 200° C. For example, in a case of film insertion with use of a polyamide resin sheet, the polyamide resin sheet of the present invention allows for insert molding at a temperature higher than in the case of conventional (non-NOC) products. This advantageously broadens the range of resin materials from which selection is to be made.

(2) Method of Producing Polyamide Resin Sheet of the Present Invention

A method of producing the polyamide resin sheet of the present invention is not limited to a particular one. For example, the polyamide resin sheet of the present invention can be produced by the following method. Note that, in the production method below, polyamide in a melt state is subjected to rolling elongation and then crystallized (solidified). This method is completely different from a method in which a polyamide resin sheet which has been once solidified is subjected to rolling elongation so as to produce a stretched sheet.

Figure 12:
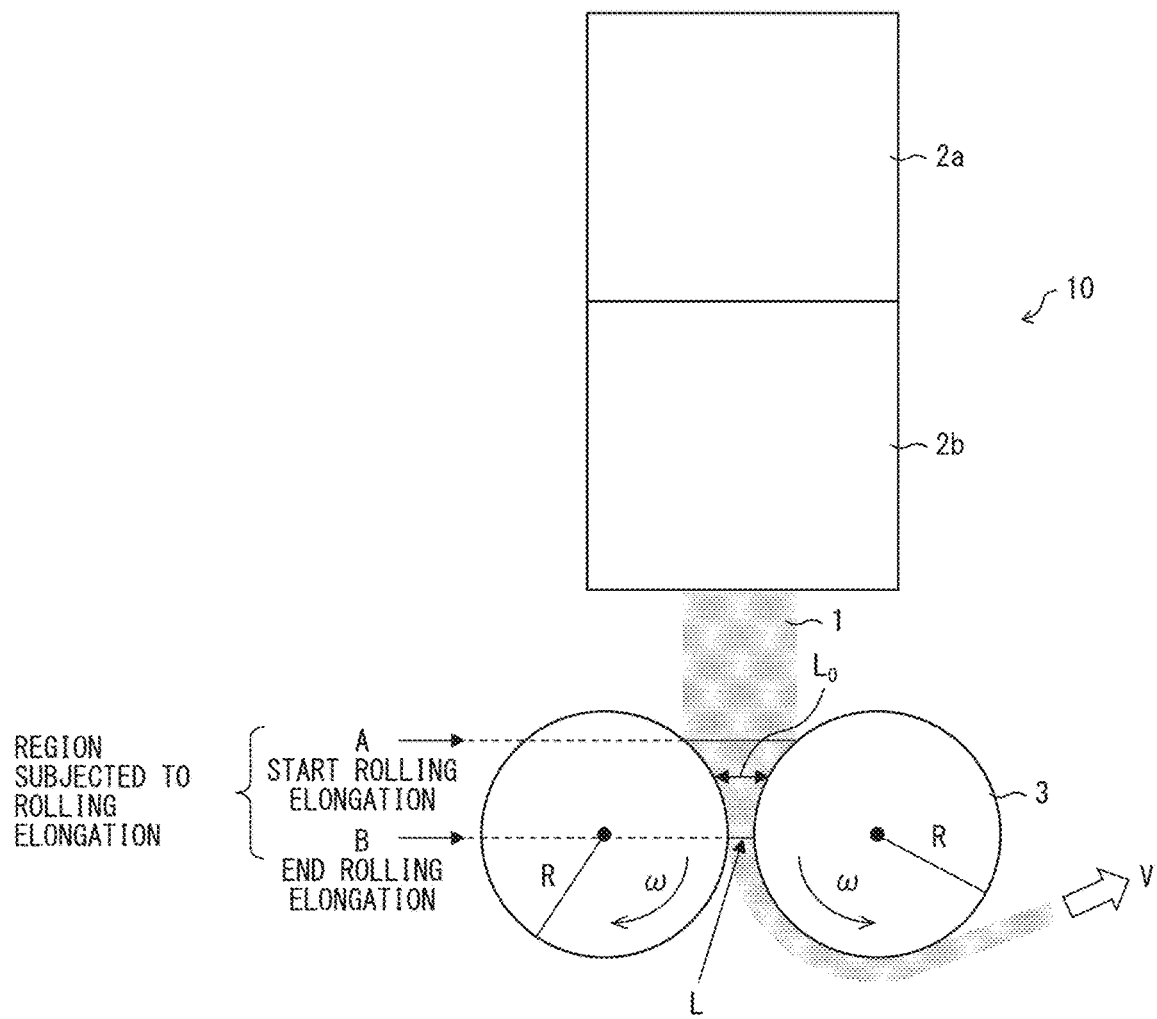
FIG. 12 is a diagram schematically showing a rolling elongation crystallization device used for preparing the samples in Example.

FIG. 12 is a view schematically illustrating a device (rolling elongation crystallization device 10) for producing the polyamide resin sheet of the present invention. The rolling elongation crystallization device 10 includes: a supercooled melt feeder (including an extruder 2a for melting the polyamide and feeding a melt of the polyamide; and a cooling adapter 2b for cooling the melt fed from the extruder 2a to a supercooled state); and sandwiching rollers 3. In the supercooled melt feeder, a slit die (not illustrated) is provided at an outlet of the extruder 2a, and a shape of an end part of the slit die is a quadrangular shape. The polyamide melt discharged from the slit die is cooled to a supercooled state while passing through the cooling adapter 2b (the melt in the supercooled state will be referred to as "supercooled melt"), and the supercooled melt is then discharged toward the sandwiching rollers 3. In a case where a difference between an equilibrium melting point and a crystallization temperature is defined as "supercooling degree $\Delta T$", a particularly optimal supercooling degree is not particularly limited because the supercooling degree notably varies depending on the type of polymer and characterization. In the case of polyamide, for example, the supercooling degree $\Delta T$ is preferably 13° C. to 58° C. (more preferably 23° C. to 55° C., even more preferably 38° C. to 53° C.).

The sandwiching rollers 3 are provided so that a pair of rotatable rollers face each other. The sandwiching rollers 3 is configured to (i) sandwich the supercooled melt 1 fed from the supercooled melt feeder and (ii) elongate the supercooled melt 1 in a rotating direction of the rollers so as to form the supercooled melt 1 into a sheet-like form.

In a case where the polyamide resin sheet of the present invention is to be produced, the supercooled melt 1 can be crystallized by (i) feeding the supercooled melt 1 from the supercooled melt feeder, (ii) sandwiching the supercooled melt 1 between the sandwiching rollers 3, and (iii) elongating the supercooled melt 1 by rolling at an elongation strain rate not lower than a critical elongation strain rate. This allows the supercooled melt 1 to become an oriented melt, and allows for crystallization while such a state is maintained. As a result, nucleation (called homogeneous nucleation) and growth occur, without the help of a foreign substance, through the molecular chains contained in the oriented melt meeting each other. This consequently allows for generation of NOCs, and therefore the polyamide resin sheet of the present invention can be produced.

The method of producing the polyamide resin sheet of the present invention is preferably arranged so that a water content of a sample to be subjected to rolling elongation is low. This is because, as shown in Example discussed later, in a case where the water content of the sample is high (for example, in a case where the water content is 0.20% or more), a supercooled melt fed from the supercooled melt feeder expand due to water vapor, so that it is not possible to produce the polyamide resin sheet of the present invention. The water content of the sample is not particularly limited, provided that the water content is approximately at a level which allows the polyamide resin sheet of the present invention to be produced. The water content is preferably less than 0.20%, more preferably less than 0.15%, and even more preferably less than 0.10%.

The method of producing the polyamide resin sheet of the present invention is different from those disclosed in International Publication No. WO 2010/084750 and International Publication No. WO 2016/035598 in that a sample having a low water content (e.g., less than 0.2%) is subjected to rolling elongation.

The method of producing the polyamide resin sheet of the present invention with use of the rolling elongation crystallization device 10 illustrated in FIG. 12 will be described in more detail below. In FIG. 12, focus is placed on a region (hereinafter, referred to as "region AB") from the start of rolling elongation (A) to the end of the rolling elongation (B) with use of the sandwiching rollers 3. R is a radius of each of the sandwiching rollers 3 of the rolling elongation crystallization device 10, $\omega$ is an angular velocity of each of the sandwiching rollers 3, $\theta$ is an angle at which each of the sandwiching rollers 3 rotates, $L_0$ is a thickness of a supercooled melt at any location in the region AB, L is a thickness of the polyamide resin sheet at point B, which is a point after the rolling elongation has ended, V is a sheet take-off speed of the sandwiching rollers, and $\varepsilon$ is the elongation strain rate. The roller rotation angle $\theta$ in the region AB is extremely small.

$$\theta \ll 1 \text{ (rad)} \tag{1}$$

The radius R of the rollers is extremely larger than the sheet thicknesses $L_0$ and L.

$$R \gg L_0, L \tag{2}$$

A minute volume $\Phi$ at any location in the region AB will be considered with a center of the minute volume as an origin. A direction (MD) in which the supercooled melt and the polyamide resin sheet move is considered as an x-axis, a width direction (TD) of the supercooled melt sheet is considered as a y-axis, and a thickness direction of the supercooled melt sheet is considered as a z-axis. The minute volume $\Phi$ is approximated by a rectangular parallelepiped, and the lengths of sides of the rectangular parallelepiped are considered as x, y, and $L_0$, respectively.

In sheet formation, it can be considered that the width of the supercooled melt sheet, i.e., y, is longer than x and $L_0$ by a sufficient amount so as not to change in length by the rolling elongation.

$$y = \text{const} \gg x, L_0 \tag{3}$$

Therefore, in the rolling elongation process with use of the sandwiching rollers, the supercooled melt sheet is compressed in the z-axis direction, and is elongated in the x-axis direction. In other words, the rolling elongation with use of the sandwiching rollers is related to only the x-axis and the z-axis.

Assuming that an elongation strain rate tensor in the x-axis direction is $\varepsilon_{xx}$ and an elongation strain rate tensor in the z-axis direction is $\varepsilon_{zz}$, a relationship between the tensors is defined as follows:

$$\varepsilon_{xx} = -\varepsilon_{zz} \tag{5}$$

In derivation of the formula (5), the following law of conservation of mass related to minute volume $\Phi$ in rolling elongation was used:

$$\Phi \approx xyL_0 = \text{const} \tag{4}$$

The strain rate $\varepsilon_{zz}$ in the z-axis direction in the region AB in FIG. 12 is defined by the following definitional equation:

$$\varepsilon_{zz} = (1/L_0) \times (dL_0/dt) \tag{6}$$

Note that t represents time.
Here, $$L_0 = 2R(1-\cos\theta) + L \tag{7}$$

and accordingly the following formula (8) is approximately obtained based on the formulae (6), (7), and (1):

$$\varepsilon_{zz} \approx -2\omega\sqrt{\{(R/L_0) \times (1-L/L_0)\}} \tag{8}$$

The elongation strain rate to be calculated is obtained from the formulae (5) and (8):

$$\varepsilon_{xx} \approx 2\omega\sqrt{\{(R/L_0) \times (1-L/L_0)\}} \tag{9}$$

The $\varepsilon_{xx}$ is a function of $L_0$ from the formula (9).
The $\varepsilon_{xx}$ has a maximum value when $L_0 = 2L \ldots$ (10).
This means that the $\varepsilon_{xx}$ reaches its maximum value at $L_0 = 2L$, and that a maximum elongation strain rate is applied on the supercooled melt.

Having the maximum value of the elongation strain rate be represented as $\varepsilon_{max}$, substitution of the formula (10) into the formula (9) obtains the following formula:

$$\varepsilon_{max} \approx \omega\sqrt{(R/L)} \tag{11}$$

In order to form the sheet at a supercritical elongation strain rate, a condition that $\varepsilon_{max}$ is equal to or more than the critical elongation strain rate $\varepsilon^*$ is required.

Therefore, the formula (11) is defined as the elongation strain rate $\varepsilon$, thereby achieving the following formula:

$$\varepsilon(R, L, \omega) = \omega\sqrt{\frac{R}{L}} \tag{12}$$

$$V = R\omega \tag{13}$$

$$\omega(R, V) = V/R \tag{14}$$

From the formulae (12) and (14), $$\varepsilon(R, L, V) = \frac{V}{R}\sqrt{\frac{R}{L}} = \frac{V}{\sqrt{RL}} \tag{15}$$

Hence, a desired polyamide resin sheet of the present invention is produced by setting, by use of the formula (15), the radius R of the sandwiching rollers, the average thickness L of the elongated polymer sheet, and the sheet take-off speed V of the sandwiching rollers so that the elongation strain rate $\varepsilon(R, L, V)$ becomes not lower than the critical elongation strain rate.

The critical elongation strain rate $\varepsilon^*(R, L, V)$ can be a rate determined by any method. For example, the rate can be calculated by the following approximate expression (Formula i):

$$\varepsilon^*(R, L, V) = \frac{V^*}{\sqrt{RL}} \tag{Formula i}$$

Here, V* denotes a sheet take-off speed V at a critical point, at which NOCs are generated upon crystallization of the polymer melt to a polyamide resin sheet having the thickness L by feeding the polyamide melt in the supercooled state so as to be sandwiched between the pair of sandwiching rollers each having a radius of R, and elongating the polyamide melt by rolling at the sheet take-off speed V.

In the method of producing the polyamide resin sheet of the present invention, the critical elongation strain rate $\varepsilon^*(R, L, V)$ can be calculated by the following approximate expression (Formula ii):

$$\varepsilon^*(R, L, V) = \frac{V}{\sqrt{RL^*}} \quad \text{(Formula ii)}$$

Here, L* denotes a thickness L of the polyamide resin sheet at a critical point, at which NOCs are generated upon crystallization of the polymer melt to the polyamide resin sheet having the thickness L by feeding the polyamide melt in the supercooled state so as to be sandwiched between the pair of sandwiching rollers each having a radius of R, and elongating the polyamide melt by rolling at the sheet take-off speed V.

A method of determining whether or not NOCs have been generated is not limited to any particular one, and it is possible to make the determination by, for example, an X-ray diffractometry method which will be described in Example discussed later.

The following description will discuss Example, to describe the embodiment of the present invention in more detail. It should be noted that the present invention is not limited to Example, and details thereof can take various aspects. The present invention is not limited to the description of the embodiment above, but may be altered within the scope of the claims. The present invention covers, in its scope, any embodiment derived from an appropriate combination of technical means disclosed in different embodiments.

EXAMPLE

In Example herein, the experiment was conducted with use of PA66 as an example of a polyamide resin. However, a person skilled in the art will understand that, in view of this Example, NOCs can be likewise formed in any polyamide resin other than PA66.

(1) Preparation of Samples in Example and Comparative Example

In Example and Comparative Example herein, PA66 shown in Table 1 were used as materials for samples.

TABLE 1

| Material | Grade number | $M_w$ | $M_n$ | $M_w/M_n$ |
|---|---|---|---|---|
| PA66 | I | 87,000 | 37,700 | 2.31 |
| PA66 | II | 72,280 | 33,780 | 2.14 |

In Table 1, "$M_n$" represents a number-average molecular weight, "$M_w$" represents a weight-average molecular weight, and "$M_w/M_n$" represents a coefficient of dispersion. $M_n$, $M_w$, and $M_w/M_n$ of the polyamide were measured with use of HLC-8320GPC, manufactured by Tosoh Corporation. As a column, TSK-gel GMHHR-M×2 was used at 40° C. As a solvent of polyamide, a mixed solvent was used in which chloroform and hexafluoroisopropyl alcohol (HFIP) were mixed at a ratio of 1:1. Note that the equilibrium melting point of PA66 was approximately 303° C.

With use of the rolling elongation crystallization device schematically illustrated in FIG. 12, PA66 samples shown in Table 1 were elongated and crystallized. Conditions in the elongation and crystallization are shown in Table 2.

TABLE 2

| | Material | | | Formation | | | |
|---|---|---|---|---|---|---|---|
| | | | Water | Extrusion | Roller | | |
| Sample number | Grade number | Pretreatment number | absorption rate/ % | Maximum temperature $(T_{max})/°$ C. | Temperature of melt $(T_{melt})/°$ C. | Elongation strain rate $(\varepsilon)/s^{-1}$ | Sample thickness $L_{obs}$/mm |
| 1 | I | D | 0.011 | 310 | 255 | 98 | 0.2 |
| 2 | I | D | 0.011 | 310 | 255 | 133 | 0.21 |
| 3 | II | A | 0.03 | 310 | 259 | 564 | 0.58 |
| 4 | I | D | 0.011 | 310 | 261.5 | 17 | 0.19 |
| 5 | I | D | 0.011 | 310 | 261.5 | 6 | 0.29 |
| 6 | I | A | 0.03 | 310 | 254 | 359 | 0.86 |
| 7 | II | E | 0.1 | 310 | 250 | 455 | 0.44 |
| 8 | II | A | 0.03 | 310 | 258 | 536 | 0.57 |
| 9 | I | D | 0.011 | 310 | 261.5 | 92 | 0.24 |
| 10 | I | D | 0.011 | 310 | 261.5 | 0 | 0.2 |

In Table 2, "Maximum temperature $(T_{max})/°$ C." represents a temperature set in the extruder when PA66 is melted by the heater in the extruder so as to prepare a PA66 melt. Temperature of melt $(T_{melt})/°$ C. in Table 2 represents a temperature of surfaces of the rollers (≈temperature of PA66 melt) when the PA66 melt is elongated by rolling with the rollers. Elongation strain rate $(\varepsilon)/s^{-1}$ in Table 2 represents an elongation strain rate when the PA66 melt is elongated by rolling with the rollers. Thickness of sample $L_{obs}$/mm in Table 2 represents a thickness of a sample obtained by the elongation and crystallization.

The pretreatment numbers are numbers by which products are classified, which products have been obtained by subjecting materials to dehydration or water absorption as pretreatment. The details of the pretreatment numbers are as follows.

Pretreatment number D (factory-shipped product): 25 kg of factory-shipped product was opened, and then divided into 3 kg-sets which were put into respective aluminum bags. Then, the aluminum bags were sealed.

Pretreatment number A (Vacuum-dehydrated product): 25 kg of factory-shipped product was opened, and then dehydrated at 100° C. for 24 hours while being vacuum-pumped (at 0.1 Pa) with use of a rotary pump (RP). After the heater was turned off, the temperature of the resultant product was lowered to 70° C. while the resultant product was being vacuum-pumped. After the vacuum was released, the resultant product was divided into 3 kg-sets which were put into respective aluminum bags. Then, the aluminum bags were sealed while a purge was being performed with use of nitrogen gas.

Pretreatment number E (Oven-heated product): Factory-shipped product was opened, and then pellets were divided into 5 kg-sets on a stainless steel vat, and then dried in an oven at 120° C. for 3 hours. Then, the resultant products were taken out of the oven, and immediately fed to an extruder at a high temperature.

Samples 1, 2, 4 through 6, 9 and 10 in Table 2 are samples prepared with use of materials of Grade I. Samples 3, 7, and 8 in Table 2 are samples prepared with use of materials of Grade II. Note that Grade I and Grade II correspond to molecular weights of respective rows in Table 1.

The water absorption rate was measured with use of Karl Fischer moisture titrator (coulometric titration) MKC-610 and CHK=501 manufactured by Kyoto Electronics Manufacturing Co., Ltd. In brief, the measurement was performed under the following conditions.

Measurement reagent: Anode: AQUAMICRON AX (manufactured by Mitsubishi Chemical Corporation), Cathode: AQUAMICRON CXU (manufactured by Mitsubishi Chemical Corporation)

Measurement temperature: 185° C. (sampler purge for 0 seconds, and cell purge for 60 seconds)

Relative drift value: 0.2 μg/sec

Stability determining value: 0.1 μg/min

End point electric potential: 200 mV (2) Observation with Use of Polarization Microscope The samples obtained above were observed with use of a polarization microscope. The polarization microscope used was BX51N-33P-OC manufactured by Olympus Corporation and observation was performed in crossed Nicols. In order to quantitatively measure change in retardation, a sensitive color test plate was inserted between a polarizer and an analyzer (polarizing plate) of the polarization microscope (Reference Literature: Koubunnshisozai no henk-oukenbikyou nyuumon (Introduction to polarization microscope for polymer material), Yu Awaya, AGNE Gijutsu Center Inc., 2001, p. 75-103). The observation with use of the polarization microscope was performed at a room temperature of 25° C. The observation was performed with respect to each of the samples in a sheet thickness direction (ND, through direction).

FIG. 1 shows results of the observation with use of the polarization microscope. Each of (a) and (b) of FIG. 1 is a polarizing microscope image of the sample 1 in Table 2 as a representative example of the samples in Example. (a) of FIG. 1 is a polarizing microscope image in a case where the sample was placed such that the MD was parallel to the sensitive color test plate, and (b) of FIG. 1 is a polarizing microscope image in a case of an extinction angle.

By rotating the sample while the sensitive color test plate was being inserted, a color (that is, retardation) in the elongation direction (MD) changed from red-purple to yellow ((a) of FIG. 1) and then to red-purple, and thus showed a distinct extinction angle (red-purple color) ((b) of FIG. 1). From the change in retardation, the sample in Example (sample 1 in Table 2) was found to have polymer chains oriented in the elongation direction (MD). It was also found that the crystal size was not more than the resolution of the polarizing microscope, so that the combination of elongation and crystallization accelerated the crystallization by $10^6$ times more.

These results revealed that NOCs were generated.

(3) X-ray Diffractometry (Small-Angle X-ray Scattering Method)

The samples were observed by the SAXS method. The SAXS method was carried out in conformity to "Koubunnshi Ekkusu-sen kaisetsu (Polymer X-ray diffraction); Masao Kakudo, Nobutami Kasai, MARUZEN PUBLISHING CO., LTD., 1968" and "Koubunnshi Ekkusu-sen kaisetsu (Polymer X-ray diffraction), 3.3 edition, Toru Masuko, Yamagata University Co-op, 1995". More specifically, the SAXS method was carried out with beam line BL03XU or BL40B2 at Japan Synchrotron adiation Research Institute (JASRI), SPring-8 under the following conditions: a wavelength λ of an X-ray=0.1 nm to 0.15 nm; a camera length=1.5 m to 3 m; a detector=imaging plate; and a room temperature=25° C. The observation was performed in three directions, i.e., a direction (through) perpendicular to the MD and the TD, a direction (edge) parallel to the TD, and a direction (end) parallel to the MD. For the observation of the samples in the through direction and the edge direction, the MD was set to be the Z-axis direction. For the observation of the samples in the end direction, the TD was set to be the Z-axis direction. A time period during which the samples were exposed to the X-ray was 5 seconds to 180 seconds. Each of the imaging plates was scanned with use of a scanning device and reading software (raxwish, control) manufactured by Rigaku Corporation, and thus a two-dimensional image was obtained.

Figure 2:
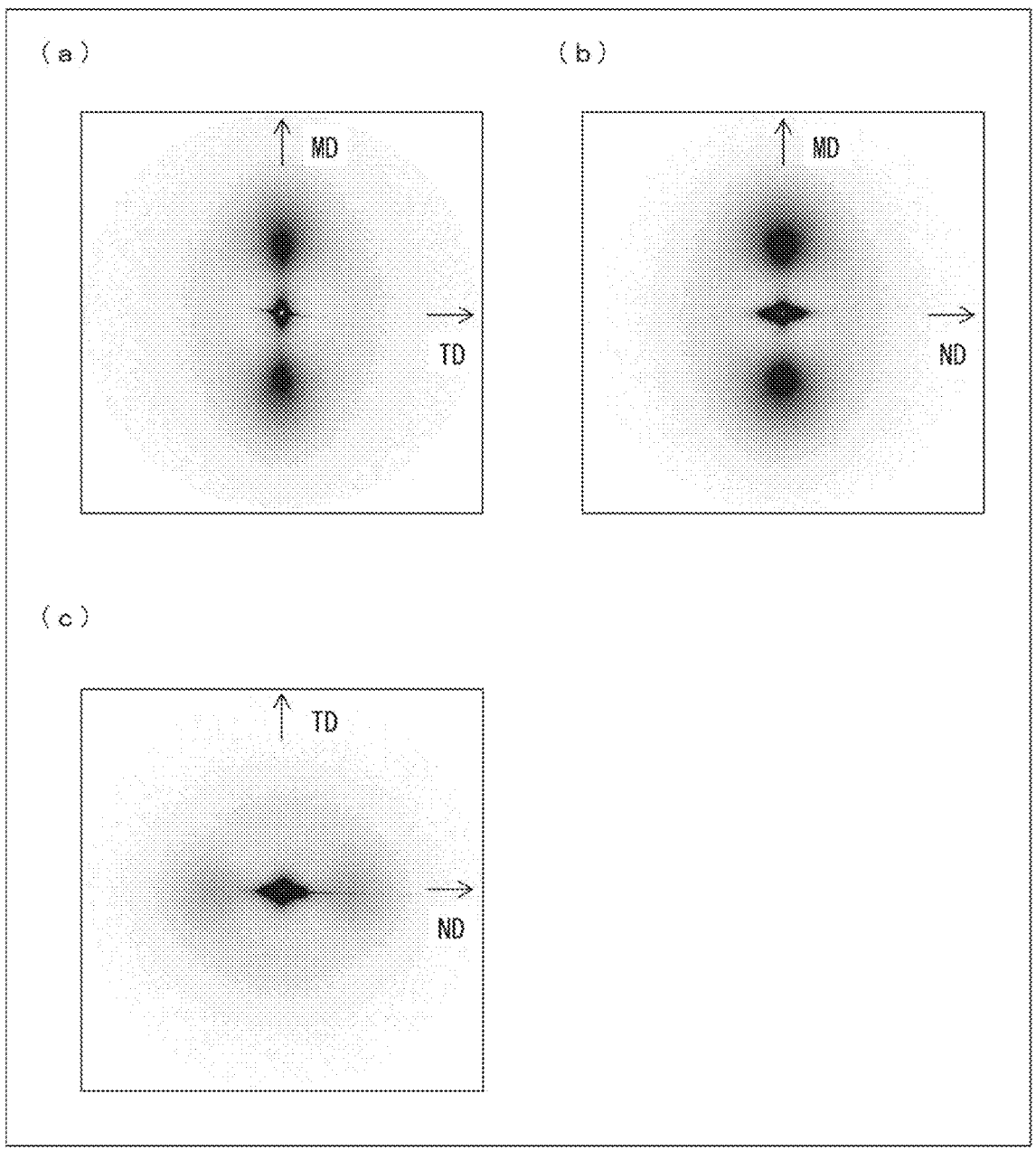
FIG. 2 is a small-angle X-ray scattering image of a sample in Example (sample 2 in Table 2). (a) of FIG. 2 shows a result of observation in through direction, (b) of FIG. 2 shows a result of observation in an edge direction, and (c) of FIG. 2 shows a result of observation in an end direction.

FIG. 2 shows SAXS images of the sample 2 in Table 2, as a representative example of the samples in Example. (a) of FIG. 2 shows a result observed from the through direction, (b) of FIG. 2 shows a result observed from the edge direction, and (c) of FIG. 2 shows a result observed from the end direction.

In each of (a) and (b) of FIG. 2, a sharp two-point image in the MD was seen. This proves that the NCs in the sample in Example (sample 2 in Table 2) are oriented in the MD.

In (c) of FIG. 2, a vague two-point image in the ND was seen. This indicates that the NCs contained in the sample in Example (sample 2 in Table 2) are also oriented in the ND. The fact that the NCs are oriented in two directions of MD and ND is a characteristic aspect which was discovered in PA66. These results revealed that NOCs were generated.

Figure 3:
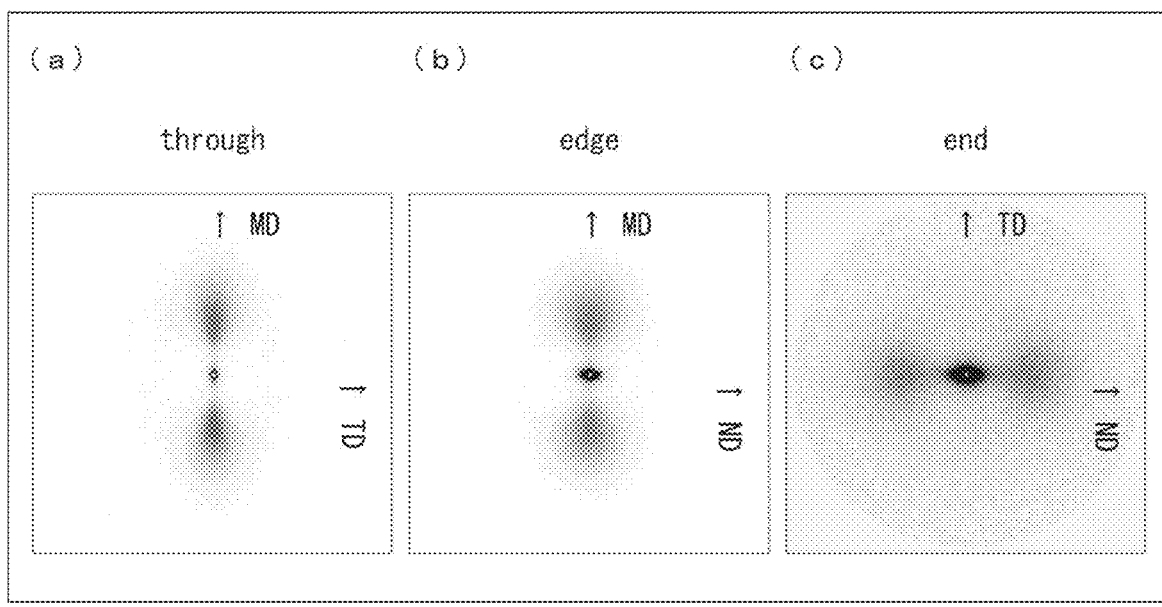
FIG. 3 is a small-angle X-ray scattering image of a sample in Example (sample 3 in Table 2). (a) of FIG. 3 shows a result of observation in through direction, (b) of FIG. 3 shows a result of observation in an edge direction, and (c) of FIG. 3 shows a result of observation in an end direction.

FIG. 3 shows SAXS images of the sample 3 in Table 2 as another example of the samples in Example. (a) of FIG. 3 shows a result observed from the through direction, (b) of FIG. 3 shows a result observed from the edge direction, and (c) of FIG. 3 shows a result observed from the end direction.

FIG. 3 shows that the sample 3 in Table 2 exhibited the results similar to those of the sample 2 in Table 2.

The results were similar between the case where Grade I (sample 2 in Table 2) was used as a sample and the case where Grade II (sample 3 in Table 2) was used as a sample. This suggests that NOCs can be formed with the molecular weights shown in Table 1.

(4) X-ray Diffractometry (Wide-Angle X-ray Scattering Method)

The samples were observed by the WAXS method. The WAXS method was carried out with beam line BL03XU or BL40B2 at Japan Synchrotron Radiation Research Institute (JASRI), SPring-8 under the following conditions: a wavelength λ of an X-ray=0.1 nm to 0.15 nm; a camera length R=260 mm to 310 mm; a detector=imaging plate; and a room temperature=25° C. For the observation of the samples in the through direction and the edge direction, the MD was set to be the Z-axis direction. For the observation of the sample in the end direction, the TD was set to be the Z-axis direction. A time period during which the samples were exposed to the X-ray was 10 seconds to 180 seconds. Each of the imaging plates was scanned with use of a scanning device and reading software (raxwish, control) manufactured by Rigaku Corporation, and thus a two-dimensional image was obtained.

Figure 4:
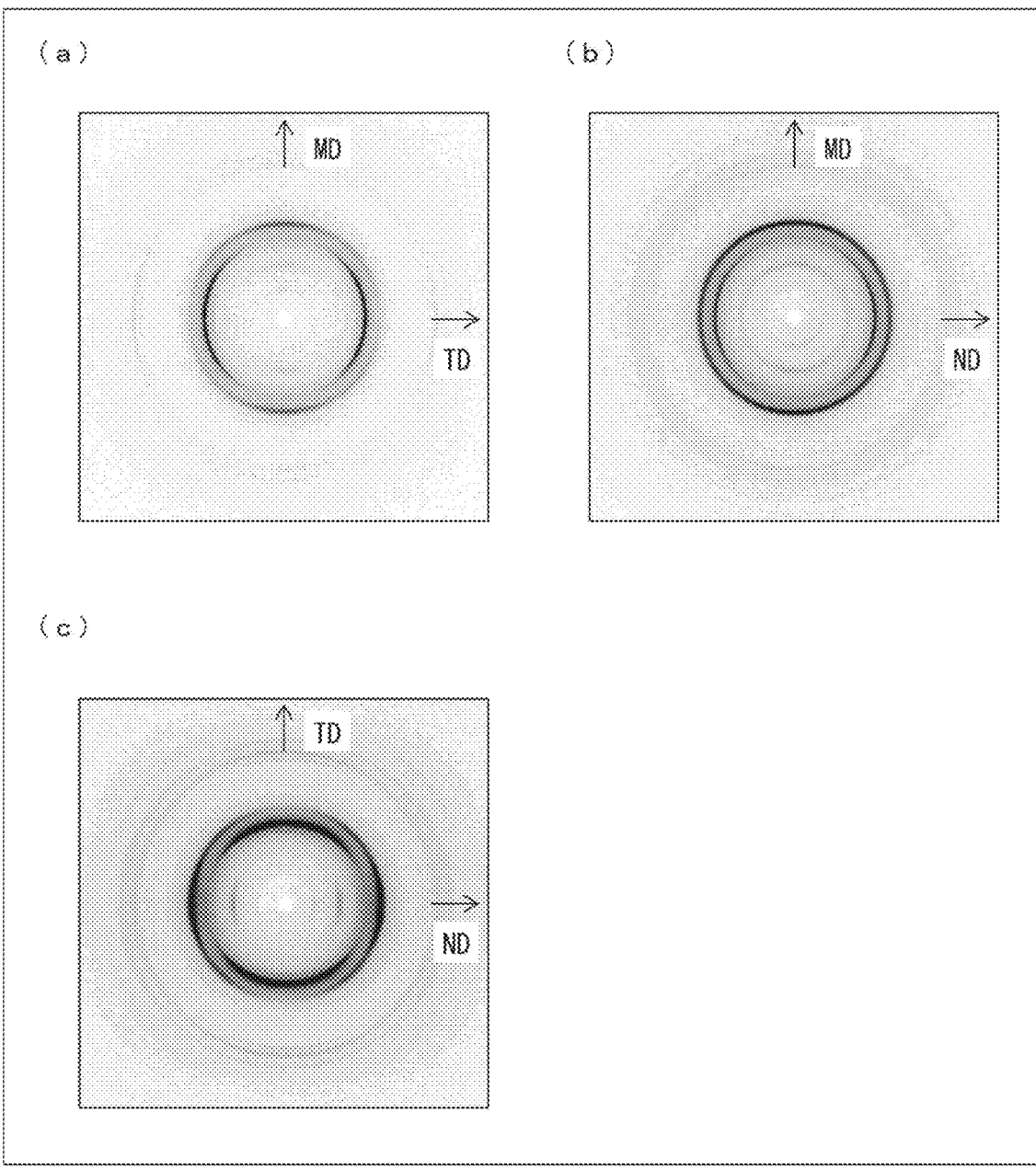
FIG. 4 is a wide-angle X-ray scattering image of the sample in Example (sample 2 in Table 2). (a) of FIG. 4 shows a result of observation in through direction, (b) of FIG. 4 shows a result of observation in an edge direction, and (c) of FIG. 4 shows a result of observation in an end direction.

FIG. 4 shows WAXS images of the sample 2 in Table 2 as a representative example of the samples in Example. (a) of FIG. 4 shows a result observed from the through direction, (b) of FIG. 4 shows a result observed from the edge direction, (c) of FIG. 4 shows a result observed from the end direction.

As shown in (a) and (b) of FIG. 4, the polymer chain (c-axis of crystal) of the sample in Example (sample 2 in Table 2) was oriented in the MD.

In addition, as shown in (c) of FIG. 4, the polymer chain (c-axis of crystal) of the sample in Example (sample 2 in Table 2) was also oriented in the ND. The fact that the NCs are oriented in two directions of MD and ND is a characteristic aspect which was discovered in PA66. These results revealed that NOCs were generated.

Figure 5:
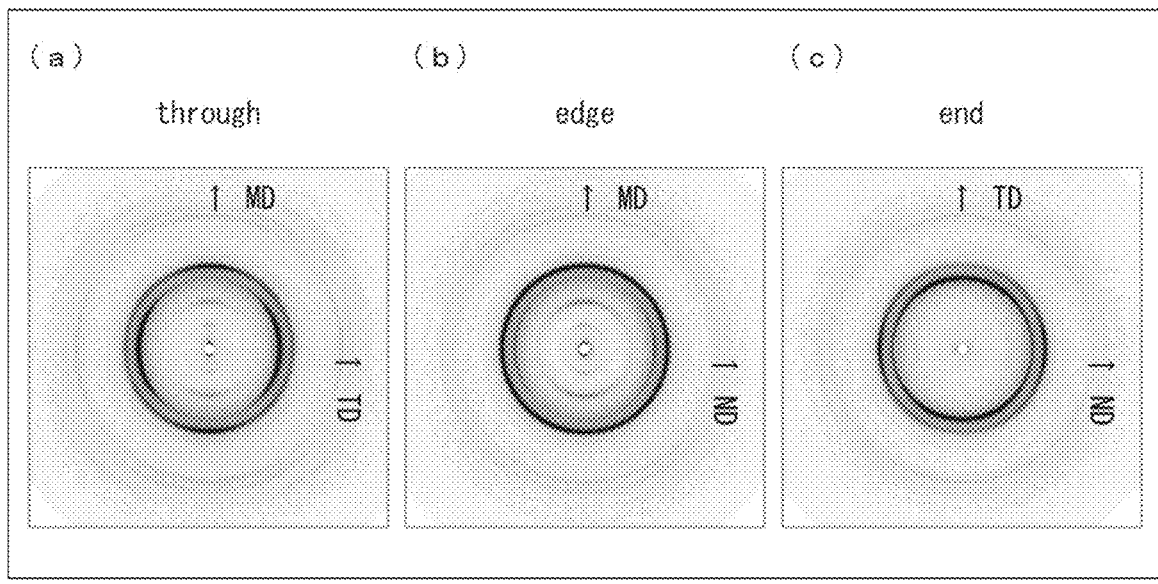
FIG. 5 is a wide-angle X-ray scattering image of the sample in Example (sample 3 in Table 2). (a) of FIG. 5 shows a result of observation in through direction, (b) of FIG. 5 shows a result of observation in an edge direction, and (c) of FIG. 5 shows a result of observation in an end direction.

FIG. 5 shows WAXS images of the sample 3 in Table 2 as another example of the samples in Example. (a) of FIG. 5 shows a result observed from the through direction, (b) of FIG. 5 shows a result observed from the edge direction, (c) of FIG. 5 shows a result observed from the end direction.

FIG. 5 shows that the sample 3 in Table 2 exhibited the results similar to those of the sample 2 in Table 2.

The results were similar between the case where Grade I (sample 2 in Table 2) was used as a material and the case where Grade II (sample 3 in Table 2) was used as a material. This suggests that NOCs can be formed with the molecular weights shown in Table 1.

(5) Structural Analysis of Critical Elongation Strain Rate

The elongation strain rate (critical elongation strain rate $\varepsilon^*$), which is a critical point at which NOCs of polyamide are obtained, was analyzed. The critical elongation strain rate $\varepsilon^*$ was determined through making comparison, by observation with use of a polarizing microscope, between polyamide resin sheets produced by use samples having differing elongation strain rates $(\varepsilon)/s^{-1}$. The observation with use of the polarizing microscope was performed by the method in (2) above.

Figure 6:
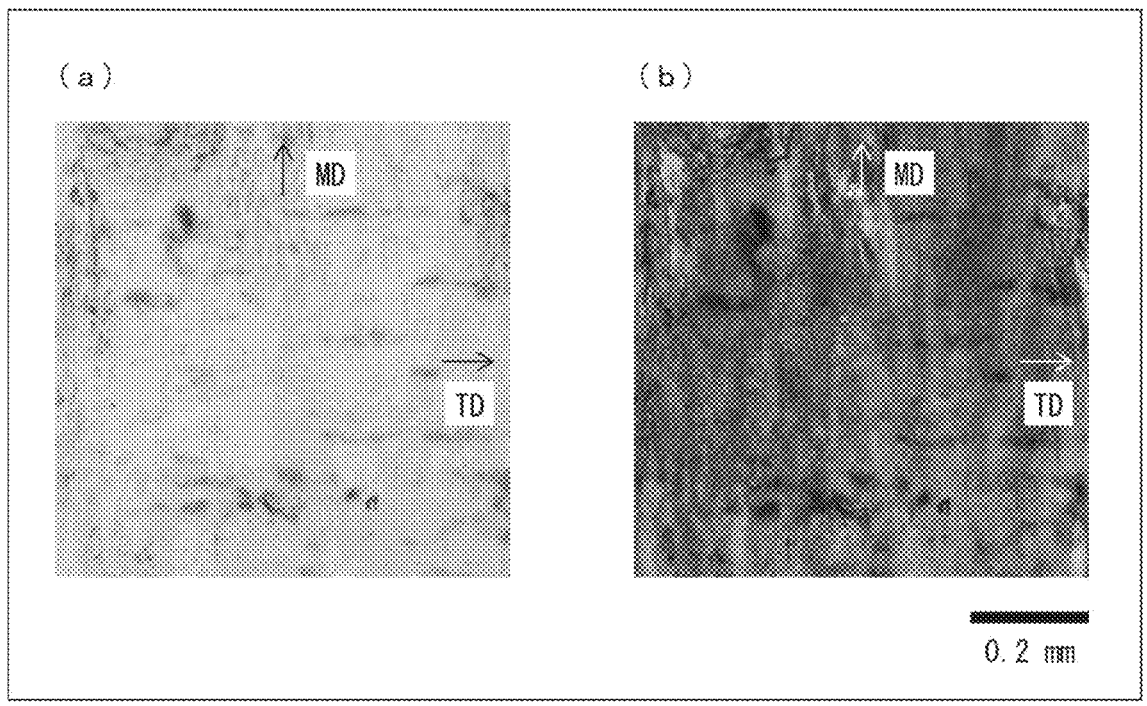
FIG. 6 is a set of views illustrating polarizing microscope images (results of observation in a through direction) of a sample in Example (sample 4 in Table 2).

FIG. 6 shows polarizing microscope images of the sample 4 in Table 2 as representative examples of the samples in Example. (a) of FIG. 6 is a polarizing microscope image in a case where the sample was placed such that the MD was parallel to the sensitive color test plate, and (b) of FIG. 6 is a polarizing microscope image in a case of an extinction angle.

FIG. 6 revealed that the sample in Example (sample 4 in Table 2) has polymer chains oriented in the elongation direction (MD). It was also found that the crystal size was not more than the resolution of the polarizing microscope. These results revealed that NOCs were generated in the sample in Example (sample 4 in Table 2).

Figure 7:
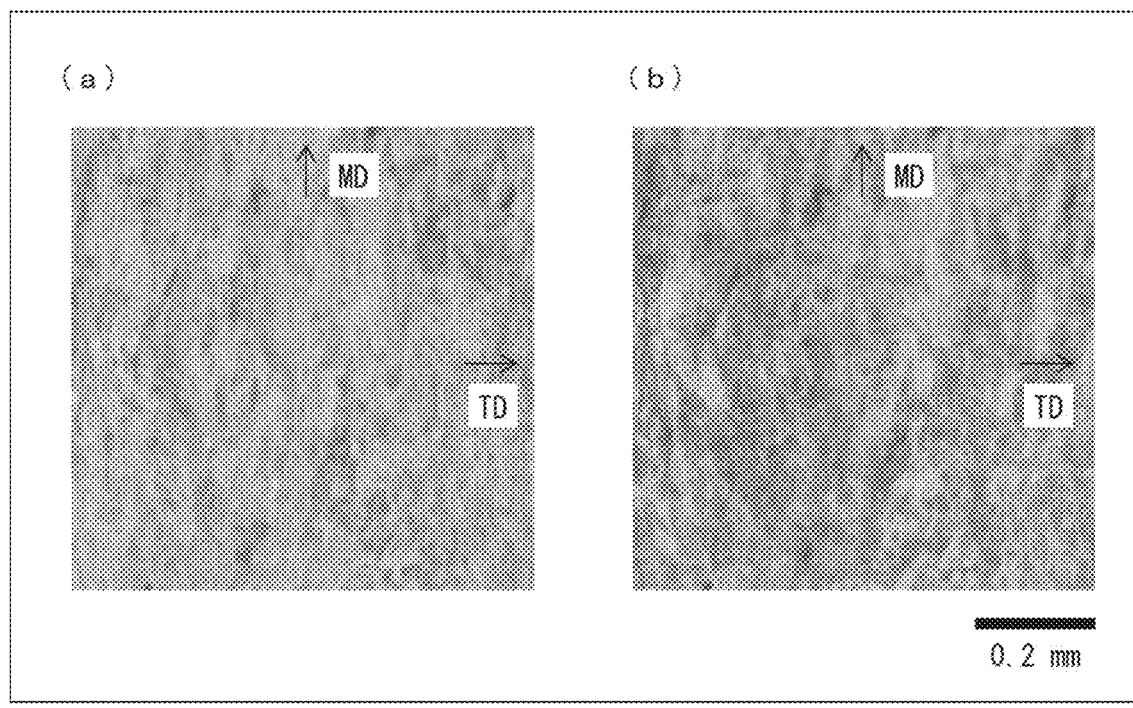
FIG. 7 is a set of views illustrating polarizing microscope images (results of observation in a through direction) of a sample in Comparative Example (sample 5 in Table 2).

Next, FIG. 7 shows polarizing microscope images of the sample 5 in Table 2 as representative examples of the samples in Comparative Example. (a) of FIG. 7 is a polarizing microscope image in a case where the sample was placed such that the MD was parallel to the sensitive color test plate, and (b) of FIG. 7 is a polarizing microscope image in a case of an extinction angle.

FIG. 7 revealed that in the sample in Comparative Example (sample 5 in Table 2), FCCs were generated, so that polymer chains were not oriented. These results revealed that FCCs were generated in the sample in Comparative Example (sample 5 in Table 2).

The results of the observation with the polarizing microscope revealed that (i) NOCs were generated in the sample in Example (sample 4 in Table 2), which had an elongation strain rate of $\varepsilon=17$ s$^{-1}$ and (ii) FCCs, which were not oriented, were generated in the sample in Comparative Example (sample 5 in Table 2), which had an elongation strain rate of $\varepsilon=6$ s$^{-1}$.

Hence, it was revealed that the critical elongation strain rate $\varepsilon^*$ of PA66 was notably small as shown by the following formula (16), and that PA66 can therefore be easily put to practical use.

$$6s^{-1}<\varepsilon^*\leq 17s^{-1} \qquad (16)$$

It is inferred that the critical elongation strain rate $\varepsilon^*$ of PA66 becomes notably small because PA66 is crystallized into Mobile phase (R. Brill, J. Prakt. Chem., 161, 49 (1942)).

(6) Analysis of Heatproof Temperature

The heatproof temperature of the sample in Example (sample 6 in Table 2) was measured by a test-piece size direct-reading method in which an optical microscope was used. A test piece (length of 0.7 mm, width of 0.5 mm) was placed in a hot stage (L-600A manufactured by Linkam Scientific Instruments Ltd.) and a temperature in the hot stage was increased at a heating rate of 1 K per minute. In this case, observation and recording were performed with use of an optical microscope with a CCD camera (BX51N-33P-OC manufactured by Olympus Corporation). With use of image-analysis software (Image-Pro PLUS manufactured by Media Cybernetics, Ltd.), a length direction (MD) and a width direction (TD) of the test piece were quantitatively measured, and a temperature at which the test piece started to shrink (or expand) by 3% or more in the MD or the TD was considered as the heatproof temperature $T_h$. The melting point $T_m$ of the sample in Example (sample 6 in Table 2) was analyzed as well.

The following will show the results of analysis of the heatproof temperature of the sample in Example (sample 6 in Table 2).

Figure 8:
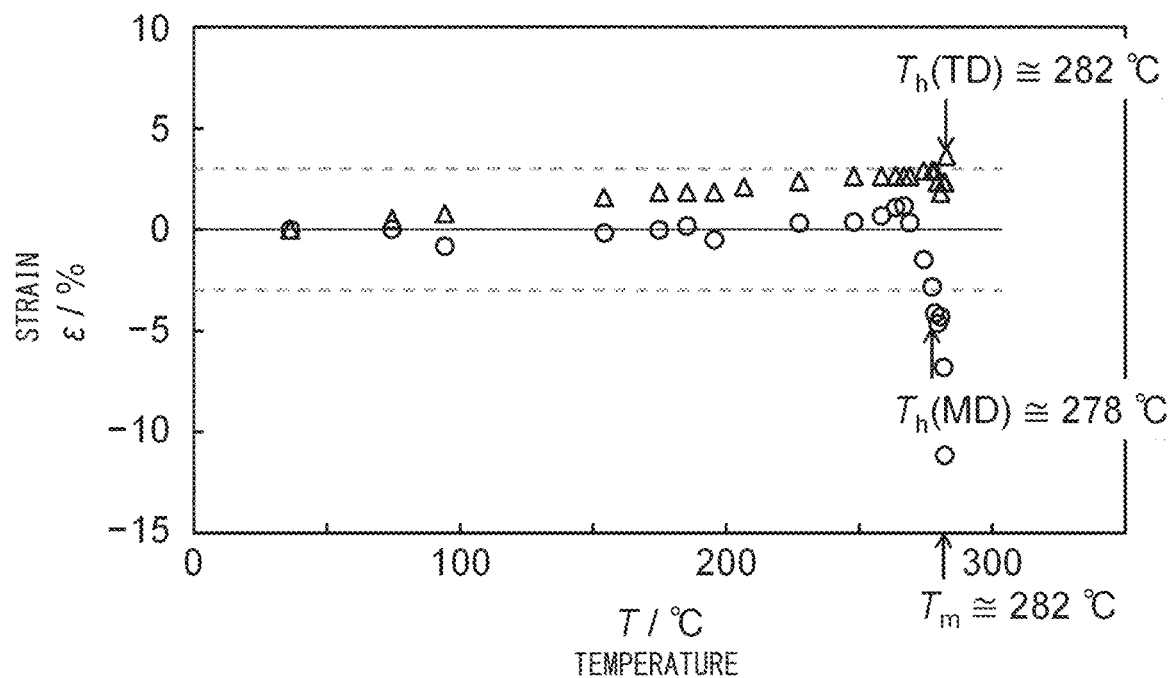
FIG. 8 is a plot showing the results of analysis of a heatproof temperature of a sample in Example (sample 6 in Table 2).

According to FIG. 8, it was found that the temperature ($T_h$ (MD)), at which a strain of 3% or more in the MD occurred, was approximately 278° C., and the temperature ($T_h$ (TD)), at which a strain of 3% or more in the TD occurred, was approximately 282° C. Therefore, the heatproof temperature $T_h$ of the sample in Example was determined to be approximately 278° C. The melting point $T_m$ of the sample in Example (sample 6 in Table 2) was approximately 282° C.

A comparison between the sample in Example (sample 6 in Table 2) of PA66 and a conventionally known PA66 sheet (heatproof temperature: 160° C., melting point: 265° C.) showed that the heatproof temperature and the melting point of the sample in Example (sample 6 in Table 2) were considerably higher than those of the conventionally known PA66 sheet. This is a remarkable effect brought about by the sample in Example (sample 6 in Table 2) herein.

(7) Analysis of Crystal Size and Structure of NOCs

From the two-point images in the MD, TD, and ND of FIG. 9, a crystal size (d) of the sample in Example (sample 2 in Table 2) was obtained. In the SAXS method, a primary peak of a curve of the small-axis X-ray scattering intensity ($I_x$) against the scattering vector (q) corresponds to the shortest distance between microcrystals (=crystal size d) in cases where microcrystals of an average size d are randomly packed (Reference Literature: A. Guinier, "Ekkusu-sen Kessyogaku no Riron to Jissai" (Theory and Practice of X-ray Crystallography), Rigaku Corporation, p. 513, 1967), and therefore the crystal size d is calculated by the following Bragg equation:

$$d = 2\pi/q \qquad \text{Bragg equation}$$

It was found that the crystal size (of NCs) of the sample in Example (sample 2 in Table 2) was as follows: 11 nm in the MD, 18 nm in the TD, and 11 nm in the ND. The size in TD was obtained by analysis of the expansion of a two-point image in the MD and the TD.

As a result of observation with the microscope and observation with the X-ray, the structure of the sample in Example (sample 2 in Table 2) was inferred as illustrated FIG. 9. That is, the NOCs contained in the sample in Example (sample 2 in Table 2) have the structure in which spindle-shaped (or rugby-ball-shaped) NCs are arranged so as to be tied in a row in the MD, and the polymer chain constituting the NCs is oriented in the MD. In addition, NCs are also oriented in the ND. The structure in which NCs are oriented in two directions of MD and ND is a characteristic structure of NOCs of PA66.

As a result of X-ray diffractometry (wide-angle X-ray scattering method) in FIGS. 4 and 5 and as a result of the heatproof temperature in FIG. 8, the sample in Example of PA66 is inferred to be highly crystallized.

(8) Analysis of Whether or Not NOCs are Generated Based on Water Absorption Rate It was analyzed whether or not NOCs were generated based on the water absorption rate of a sample for producing the polyamide resin sheet of the present invention. The analysis was carried out by making, by observation with use of a polarizing microscope, comparisons between samples having differing water absorption rates. The observation with use of the polarizing microscope was performed by the method in (2) above.

Figure 10:
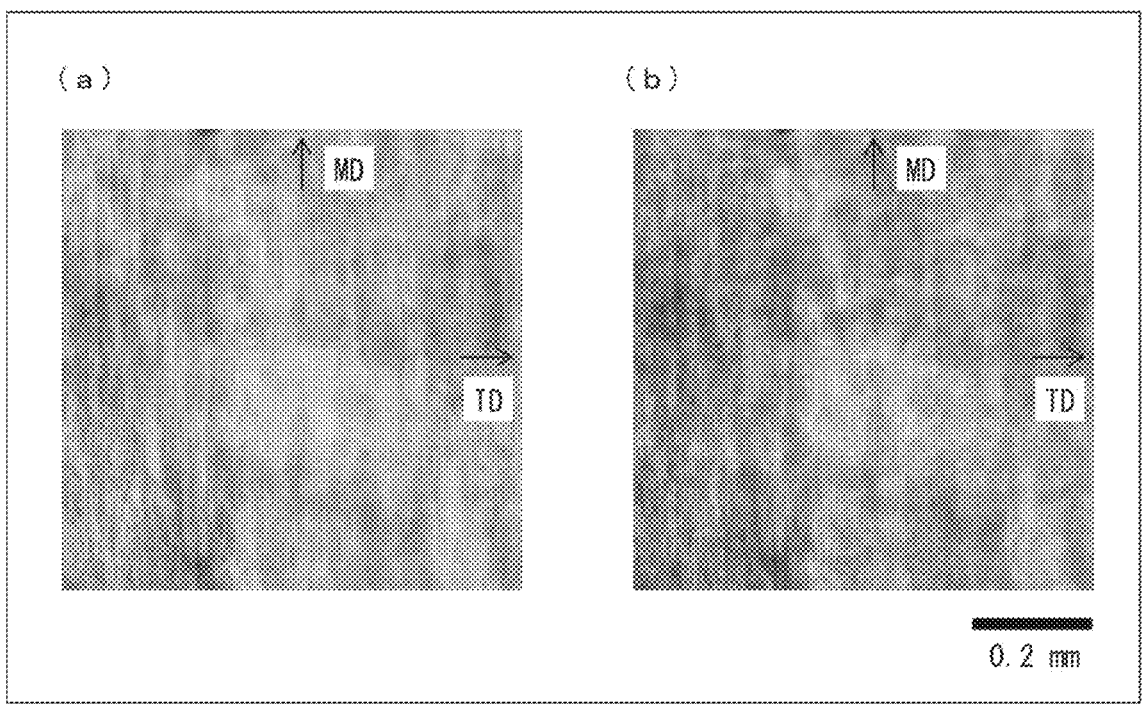
FIG. 10 is a set of views illustrating polarizing microscope images (results of observation in a through direction) of a sample in Comparative Example (sample 7 in Table 2).

FIG. 1 shows polarizing microscope images of the sample 1 in Table 2 as representative examples of the samples in Example. FIGS. 3 and 5 show polarizing microscope images of the sample 3 in Table 2 as other examples of the samples in Example. Furthermore, FIG. 10 shows polarizing microscope images of the sample 7 in Table 2 as representative examples of the samples in Comparative Example. (a) of each of FIGS. 1, 3, 5, and 10 is a polarizing microscope image in a case where the sample was placed such that the MD was parallel to the sensitive color test plate, and (b) of each of FIGS. 1, 3, 5, and 10 is a polarizing microscope image in a case of an extinction angle.

In the samples in Example (samples 1 and 3 in Table 2), NOCs were generated (FIGS. 1, 3, and 5). In contrast, FIG. 10 shows that in the sample in Comparative Example (sample 7 in Table 2), the melt expanded and FCCs became isotropic, so that no NOCs were generated.

Note that Table 2 shows that the water absorption rates of the samples 1, 3, and 7 were 0.011%, 0.03%, and 0.1%, respectively. This suggests that for generation of NOCs, it is necessary to maintain the water absorption rate of the sample at a low level.

It is inferred that the water absorption rate of the sample in Comparative Example (sample 7 in Table 2) was increased by the pretreatment (Pretreatment number E) because PA66 has a property of absorbing water fast quickly at a high temperature.

(9) Analysis of Crystal Structure

The crystal structure (Unit cell Structure) of the sample in Example (sample 8 in Table 2) was analyzed. The scattering intensity ($I_{Xraw}$) of raw data was calculated by integrating the angle of deviation ($\beta$) at a point ±2.8° C. from the equator line. In addition, indexing was performed by use of the lattice constant values disclosed in N. A. Jones, E. D. T. Atkins & M. J. Hill, J. Polymer Sci. Part B, 38, 1209 (2000).

Figure 11:
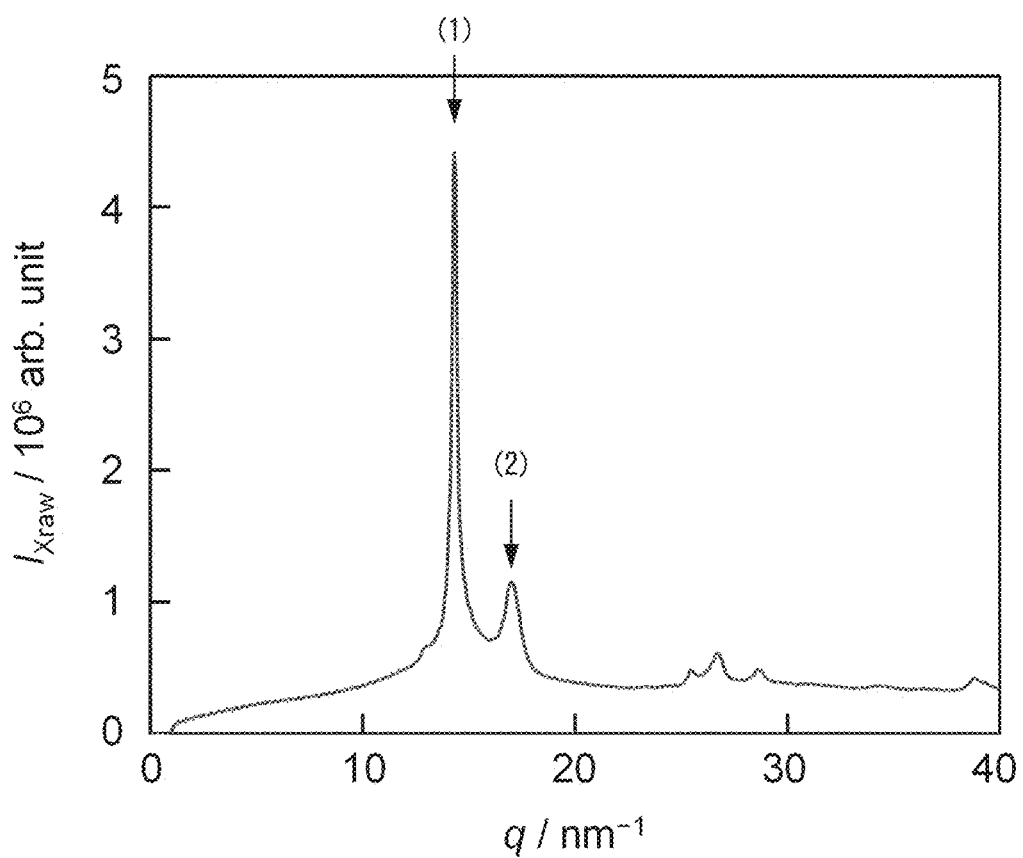
FIG. 11 shows results of analysis of a crystal structure (Unit cell Structure) of a sample in Example (sample 8 in Table 2).

As a result, it was found that the sample in Example (sample 8 in Table 2) had the most stable α-crystal structure in polyamide (FIG. 11).

(10) Analysis of Water Absorbent Property

The water absorbent properties of the polyamide resin sheet of the present invention (NOC) and the conventional product (FCC) were evaluated by the Karl Fischer method described above. As a representative example of the samples in Example, the sample 9 in Table 2 was used. As a representative example of the samples in Comparative Example, the sample 10 in Table 2 was used.

Table 3 shows the results.

TABLE 3

| Sample number | Form | Water content/% |
|---|---|---|
| 9 | NOC | 2.06 |
| 10 | FCC | 2.49 |

It was revealed that the polyamide resin sheet of the present invention (NOC) has a water content lower than that of the conventional product (FCC). This indicates that the polyamide resin sheet of the present invention (NOC) has a water absorbent property lower than that of the conventional product (FCC).

(11) Analysis of Tensile Stress

The tensile stresses of the polyamide resin sheet of the present invention and of the conventional product were analyzed.

(1) Preparation of Samples in Example and Comparative Example

In Example and Comparative Example herein, polyamide 66 resin (LEONA™ 1700), was used as a material of the samples.

The sample in Example herein was prepared as follows. That is, with use of the rolling elongation crystallization device schematically illustrated in FIG. 12, the polyamide 66 resin (LEONA™ 1700), was elongated and crystallized, so that polyamide resin sheets were obtained (samples 11, 12, and 13). Conditions in the elongation and crystallization are shown in Table 4.

TABLE 4

| Sample number | Sample information | | | Formation conditions | | | |
|---|---|---|---|---|---|---|---|
| | | | | Extrusion | Roller | | |
| | | | | Maximum temperature $(T_{max})/°C.$ | Temperature of melt $T_{melt}/°C.$ | Elongation strain rate $(\varepsilon)/s^{-1}$ | Sample thickness $L_{obs}/mm$ |
| | Mn | Mw | Mw/Mn | | | | |
| 11 | 36,420 | 95,360 | 2.62 | 310 | 263 | 16 | 0.23 |
| 12 | 42,380 | 100,300 | 2.37 | 310 | 263 | 36 | 0.17 |
| 13 | 40,230 | 98,760 | 2.45 | 310 | 257 | 37 | 0.17 |

The sample in Comparative Example was prepared as follows. That is, with use of an extruder having a 40 mmφ-uniaxial full-flight screw with a circular die, polyamide 66 resin (LEONA™ 1700) was melted at a maximum extrusion temperature of 290° C. Then, a discharged tube was taken up while being air-cooled. While the tube was being taken up, substantially at the same time, the tube was stretched at a stretch temperature of 170° C. and a stretch ratio of 3.0 times (both lengthwise and widthwise) by a tubular stretching method in which the tube was stretched (inflated) lengthwise and widthwise simultaneously, through applying an atmospheric pressure to the center of the tube. This produced a polyamide resin film (sample 14) having a thickness of 50 μm.

(2) Method of Preparing Test Piece and Regulating Condition

Figure 13:
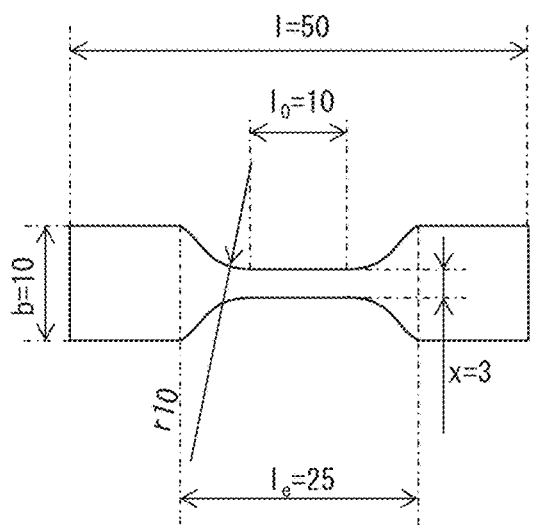
FIG. 13 is a diagram showing a test piece shape of a sample used in a tensile test.

With use of a punching machine to which a die is attached, the resin sheet and the resin film (inflation-molded film) were punched out so that the test piece shape illustrated in FIG. 13 was obtained. In this case, two kinds of test pieces (elongation direction (MD) and (TD) of the resin sheet) were prepared. It is difficult to distinguish between the elongation direction (MD) and the width direction (TD) of the resin film (inflation-molded film). Therefore, the resin film was punched out in the following two directions: (i) a lengthwise direction and (ii) the widthwise direction perpendicular to the length-wise direction. Then, the test piece was vacuum-dried for approximately 48 hours at 80° C. and 0.3 kPa, so as to be in an absolute dry condition.

(3) Tensile Test

The tensile test was conducted under the following conditions.

Measurement environment: 23° C., 50% RH
Tension speed: 40 mm/min
Chuck-to-chuck distance: 25 mm With use of the test piece shaped as illustrated in FIG. 13, the test was conducted in conformity to JIS7127 (ISO527-3). The results are shown in Table 5.

The following are the criteria for determining the NOCs.

Good: The extinction angle is observed, and the image is formed by a fine mottled pattern.
Moderate: Although the extinction angle is observable, a mottled pattern is indistinct.
Poor: No extinction angle is observable.

In Table 5, the maximum tensile stress indicates a higher value of stress during tensile yield and stress during tensile rupture.

TABLE 5

| Sample number | 11 | | 12 | | 13 | | 14 | |
|---|---|---|---|---|---|---|---|---|
| NOC determination | Moderate | | Good | | Good | | Poor | |
| State of test piece | Absolutely dry | | Absolutely dry | | Absolutely dry | | Absolutely dry | |
| Thickness of test piece (μm) | 230 | | 170 | | 170 | | 50 | |
| Direction of test piece | TD | MD | TD | MD | TD | MD | Lengthwise | Widthwise |
| Maximum tensile stress (MPa) | 103.9 | 138.7 | 100.3 | 134.7 | 101.2 | 136.5 | 77.9 | 81.0 |

As a result, it was found that the polyamide resin sheet of the present invention has a tensile stress higher than those of the conventional products.

INDUSTRIAL APPLICABILITY

As has been described, a polyamide resin member in accordance with an embodiment of the present invention has higher heat resistance, higher melting point, higher tensile stress, and lower water absorbent property in comparison with conventional polyamide resin members. Hence, with an embodiment of the present invention, polyamide resin members, such as PA66, which were difficult to be used in the technical fields such as those of vibration absorbing rubber products, tires, hoses, pipes, and joints due to insufficient heat resistance and/or insufficient durability, can be used for industrial products in such technical fields where heat resistance is required.

REFERENCE SIGNS LIST

1 Supercooled melt
2a Extruder
2b Cooling adapter
3 Sandwiching roller
10 Rolling elongation crystallization device

The invention claimed is:

1. A polyamide resin member comprising:
crystals of a polyamide resin,
the crystals being nano-oriented crystals containing crystals of the polyamide resin in each of which a polymer molecular chain is oriented and each of which has a crystal size of 50 nm or less,
the polyamide resin member having a melting point higher than a temperature which is 38° C. lower than the equilibrium melting point of the polyamide resin, and
the polyamide resin member having a heatproof temperature higher than a temperature which is 143° C. lower than the equilibrium melting point of the polyamide resin,
the polyamide resin member having a sheet-like form,
the crystals being such that the polymer molecular chain is oriented in an elongation direction and in a sheet thickness direction which is a direction perpendicular to the elongation direction,
the equilibrium melting point being defined as a melting point of a macroscopic-sized perfect crystal crystallized in a state in which a molecular chain of a polymer is fully stretched, and being calculated by the following formula:
$T_m^0 = \Delta H_u / \Delta S_u$, (where $\Delta H_u$ indicates enthalpy of fusion, and $\Delta S_u$ indicates entropy of fusion),
the heatproof temperature being defined as a heatproof temperature measured by a test-piece size direct-reading method with use of an optical microscope, the test-piece size direct-reading method being carried out with use of an optical microscope with a CCD camera (BX51N-33P-OC manufactured by Olympus Corporation), a hot stage (L-600A manufactured by Linkam Scientific Instruments Ltd.), and image-analysis software (Image-Pro PLUS manufactured by Media Cybernetics, Ltd.) that can quantitatively determine a size displayed on a screen, a test piece having a length of 0.7 mm and a width of 0.5 mm, the test piece being heated at a temperature increase rate of 1 K per minute, and a temperature at which the test piece starts to be strained (shrunk or expanded) by 3% or more in a length direction (MD) or a width direction (TD) being used as the heatproof temperature, and in a case where no strain (shrinkage or expansion) by 3% or more in the length direction (MD) or the width direction (TD) is observed until the melting point is reached, the melting point being used as the heatproof temperature.

2. The polyamide resin member according to claim 1, wherein
the polyamide resin is at least one polyamide resin selected from the group consisting of polyamide 4, polyamide 6, polyamide 46, polyamide 66, polyamide 610, polyamide 612, polyamide 6T, polyamide 9T, polyamide 6I, poly-2-methylpentamethylene terephthalamide, polyamide MXD6, polyamide PXD12, and a copolymer and/or a blend thereof.

3. The polyamide resin member according to claim 1, wherein
the polyamide resin is polyamide 66.

4. The polyamide resin member according to claim 3, wherein
the polyamide resin member has a melting point of 280° C. or higher and a heatproof temperature of 270° C. or higher.

5. A polyamide resin member comprising:
crystals of a polyamide resin,
the crystals being nano-oriented crystals containing crystals of the polyamide resin in each of which a polymer molecular chain is oriented and each of which has a crystal size of 50 nm or less, and
the polyamide resin member having a tensile stress of 105 MPa or more in an elongation direction in an absolutely dry condition and having a tensile stress of 90 MPa or more in a width direction in the absolutely dry condition,
the polyamide resin member having a sheet-like form,
the crystals being such that the polymer molecular chain is oriented in an elongation direction and in a sheet thickness direction which is a direction perpendicular to the elongation direction.

* * * * *